United States Patent Office 3,764,496
Patented Oct. 9, 1973

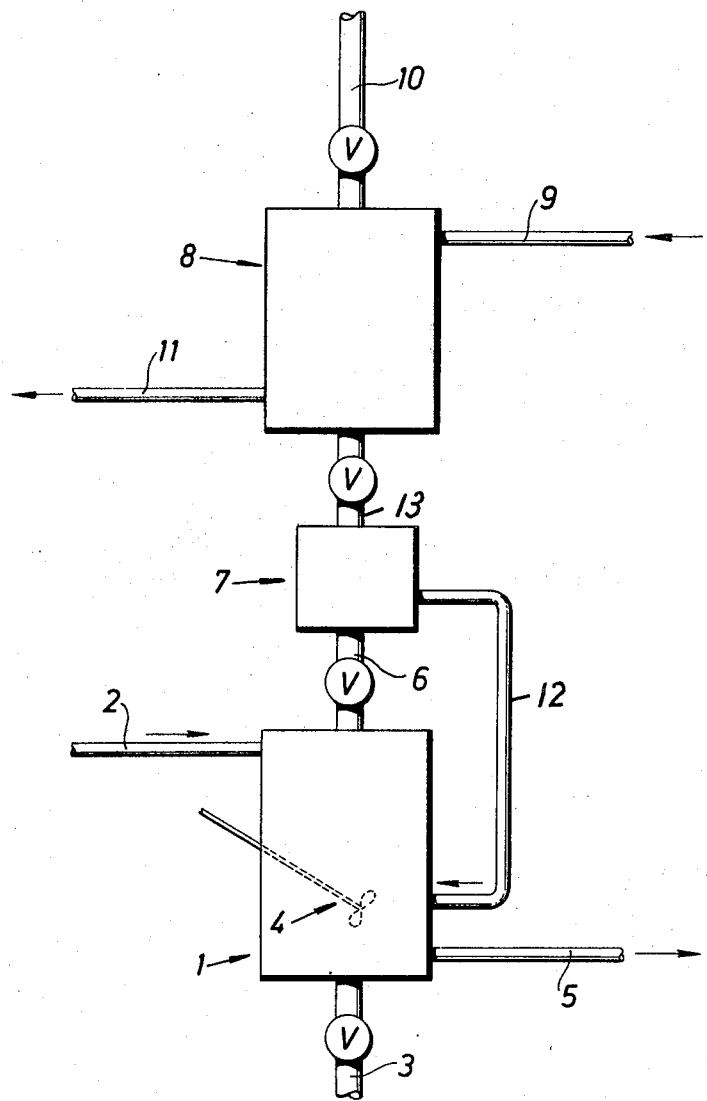

3,764,496
PROCESS FOR THE RECOVERY OF MERCURY
FROM MERCURY-CONTAINING LIQUIDS
Bengt Hultman and Erik Borje William Norgren, Ornskoldsvik, Sweden, assignors to Mo och Domsjo Aktiebolaget, Ornskoldsvik, Sweden
Filed July 12, 1971, Ser. No. 161,579
Claims priority, application Sweden, July 16, 1970,
9,876/70
Int. Cl. C01d 1/08; B01d 47/00
U.S. Cl. 204—99                                      9 Claims

ABSTRACT OF THE DISCLOSURE

A process is provided for recovering mercury from mercury-containing liquids by stripping the mercury as vapor from the liquid with an inert gas, and washing the mercury vapor-containing inert gas with a solution containing an oxidizing agent, such as active chlorine, so as to absorb the mercury vapor and oxidize elemental mercury to mercury ion which can then be dissolved in the solution in the form of complex mercury ions such as mercury chloride complex ions.

---

In the industrial electrolysis of aqueous alkali chloride solutions, a mercury amalgam cathode is used in the electrolysis cell. However, a proportion of the mercury from the cathode is lost, which is quite disadvantageous since it is desirable to reduce the mercury losses to a minimum, in order to keep the costs of the process low. Moreover, it is important nowadays to avoid the discharge of mercury to the surroundings. The mercury lost from the cathode appears in the discharge of metallic mercury, when repairing or cleaning the electrolysis cells, in the discharge of the electrolysis alkali chloride solution containing ionic mercury, as mercury vapor from the evaporation of metallic mercury, in the discharge of precipitation sludge, in graphite sludge, in the discharge of waste water as ionic mercury and as metallic mercury, and as mercury included in the reaction products, alkali hydroxide, hydrogen gas, and chlorine.

Many methods for reducing the losses of mercury have been proposed. In one method, a closed waste system is used which, if the liquid balance is favorable, makes it possible to return all of the wash water within the system to the alkali chloride solution, thereby considerably reducing the discharge of mercury-containing effluent water to the surroundings. For the purpose of separating ionic mercury, it has been proposed that ion exchange resins be used, or that the mercury be precipitated as an insoluble mercury salt, such as mercury sulfide, or by amalgamation on a mercury-reducing metal. Alkali hydroxide solutions are often freed from mercury by filtering the solutions through carbon filters, while hydrogen gas can be purified by compression and cooling methods.

However, although a number of purifying methods have been proposed, none has been entirely satisfactory. Besides causing disruptions in the electrolysis process, they are also not capable of being applied under all conditions.

In accordance with the present invention, mercury-containing liquids, such as, for example, the electrolysis liquid obtained by the electrolysis of alkali chloride, can be stripped of metallic mercury by contact with an inert gas, so that elemental mercury vapor is entrained in the gas. The elemental mercury vapor-containing inert gas is then washed with a solution containing an oxidizing agent such as active chlorine, the mercury vapor being captured therein in the form of soluble complex mercury ions such as mercury chloride complex ions. If desired, a solution enriched in mercury chloride ions can be combined with the alkali chloride solution subjected to electrolysis, so that the mercury is recycled to the electrolysis cells, thereby reducing further losses of mercury.

The method is inexpensive, and extremely simple to apply, and greatly reduces the occurrence of operational problems, both in respect of the mercury purification process and of the electrolysis. Moreover, the active chlorine or other oxidizing agent solution used in washing the mercury-containing inert gas is readily available commercially, and is inexpensive, and therefore the method of the invention is quite advantageous from an economic viewpoint. Also, since the mercury is stripped from the liquid by means of an inert gas, other nonvolatile heavy metals, such as iron, lead, vanadium, chromium and tungsten, are not entrained, and the mercury is thereby separated from them. This means that returning the chlorine-containing washing liquid to the alkali chloride solution does not result in enrichment with heavy metals so that associated interruptions in the electrolysis process can be avoided.

The process of the invention can of course be applied generally for the purification of mercury-containing liquids, and the mercury-containing liquids obtained from the electrolysis of alkali chloride solutions are only one example of such liquids.

For economic reasons, the inert gas used for stripping the mercury as vapor from the solution is primarily in the form of air, but any inert gas can be used, such as nitrogen, argon, krypton, helium, and xenon. If it is desired to use air but keep the alkali hydroxide solution that is treated with inert gas in accordance with the invention free from alkali carbonate, this can be achieved by washing the air with a small amount of aqueous alkali solution, thereby removing carbon dioxide from the air.

The inert gas will strip metallic mercury from the liquid, but it will not strip ionic mercury. The ionic mercury in the liquid phase can be converted to elemental mercury by adding a reducing agent to the liquid phase, and then contacting the liquid phase with an inert gas. Suitable reducing agents are hydrazine, divalent iron, hydroxylamine, or metal dithionites (salts of dithionous acid $HO_2S-SO_2H$, such as sodium, potassium, calcium, barium and strontium dithionite) optionally mixed with sulfite compounds or sulfur dioxide. A mixture of sodium dithionite with sulfite compounds or sulfur dioxide is preferred as the reducing agent. After the ionic mercury has been converted into elemental mercury, the mercury can be stripped as vapor by the inert gas.

The elemental mercury-containing liquid is thoroughly mixed with the inert gas at a temperature at which a high vapor pressure of mercury is obtained. Preferably, the mixing temperature is at least 50° C., and still more preferably within the range from about 70 to about 110° C. Temperatures as high as 250° C. can be used. The upper limit of temperature that is imposed is not critical, and usually is the boiling point of the liquid containing the mercury at the gas pressure used. Superatmospheric gas pressures can be used, if desired up to about 10 atmospheres. Higher pressures than this can be used, but are usually impractical.

When purifying sewage water of mercury, relatively high temperatures of the order of 70 to 110° C. and strong agitation are also favorable, but the process of the invention can be applied to sewage with good results at temperatures within the range from 0 to 100° C., with no agitation.

The liquid and gas phases are suitably mixed by means of an agitator or any system which ensures good contact between the gas-liquid phases. Gas-liquid contactors in which a stream of liquid passes concurrently or countercurrently upwardly or downwardly against a counterflow of gas, usually upward, are quite satisfactory. Spray scrubbers or towers, perforated plate towers, wetted wall columns, bubble cap plate towers, sieve plate towers, packed towers, turbo-gas mixers, orifice column mixers, injectors, jet mixers, turbo-gas absorbers, cascade towers, and bubble columns can be used.

It is preferred that the liquid and gas phases be mixed with an agitator, such as a propeller or stirrer or a turbo-gas mixer having a rotational speed of from 200 to 7000 r.p.m., preferably 1500 to 3000 r.p.m.

Mixing of the mercury-containing liquid and the inert gas should be effected under such strong agitation that the gas is disintegrated into small emulsified bubbles, so that the gas-liquid mixture acquires a milklike appearance.

Stripping of the mercury as vapor from the liquid can be effected in one or more stages, and particularly in the case of a continuous process, certain advantages are obtained by dividing the stripping process into several stages.

The mercury is then recovered from the stripping gas mixture by passing the mercury vapor containing inert gas through a gas scrubber system of conventional structure, such as, for example, a spray tower, where the mercury vapor is contacted with and dissolved in an aqueous solution containing active chlorine, so that the mercury is oxidized, and forms complex mercury ions such as in the form of mercury chloride, $HgCl_4^=$.

Any type of gas-liquid scrubber or absorber can be used, such as those indicated previously in the stripping of mercury from the liquid by inert gas, except that now the mercury is stripped from the gas by the active chlorine-containing liquid. The mercury is washed from the gas very effectively if the solution containing active chlorine is passed countercurrently to a flow of the mercury-containing inert gas through a tower filled with a suitable packing.

The active chlorine-containing solution contains free chlorine. For this purpose, chlorine water, alkali hypochlorite, such as sodium or potassium hypochlorite, or alkali chloride such as sodium or potassium chloride containing free chlorine, can be used. A solution of sodium chloride containing free chlorine is particularly preferred.

When the mercury vapor is brought into contact with this solution, the elemental mercury is oxidized by the chlorine to divalent mercury in the form of complex ions such as $HgCl_4^=$. This is a very stable complex ion, and quite soluble, so that the mercury is well retained in the solution. The solution can be charged to the alkali chloride to be electrolyzed, returning the mercury to the electrolysis cell. It can also be treated in any desired way to recover the mercury.

Although active chlorine is preferable because it also makes possible the formation of soluble $HgCl_4^=$ complex ions at the same time, it is also possible to use other oxidizing agents, such as hydrogen peroxide or potassium permanganate, with equivalent results. In this case, the solution should contain chloride ion, as from any metal chloride, to form the mercury chloride complex.

The figure shows a suitable apparatus for carrying out the process of the invention.

The apparatus includes a gas stripper 1, with an inlet line 2 at the top for the mercury-containing liquid, and outlet 6 for mercury vapor-containing inert gas, a feed line 3 at the bottom for feeding inert gas, and an outlet line 5 for removal of the liquid, now free from mercury. The gas feed line 3 terminates in a bubbler nozzle for distributing the gas in the liquid as stream of fine bubbles. The stripper 1 has an agitator 4 of the radial propeller type.

The gas stripper 1 is adapted to be filled with the mercury-containing liquid, which is thoroughly stirred by the agitator 4. The gas pases countercurrently upwardly as the stream of bubbles is well emulsified in the liquid by the agitator 4.

The outlet 6 leads to a gas-liquid separator 7, for removal of any gas-entrained liquid, which is then returned via line 12 to the stripper 1.

From the gas-liquid separator 7 a line 13 leads to an absorption tower 8 filled with glass packing. The absorption tower has at the upper end an inlet line 9, for introduction of a washing solution containing active chlorine or other oxidizing agent, and an outlet 11 at the base for removal of the active chlorine solution, now containing mercury. The outlet 10 is for mercury-free washed inert gas. The gas passes countercurrently to the flow of washing solution through tower 8.

In operation, the mercury-containing liquid phase enters via the inlet line 2 into the upper portion of the stripper 1, and passes countercurrently downwardly against an upward stream of inert gas, which is thoroughly mixed in the liquid phase by the agitator 4, to form a gas-liquid mixture having a milklike appearance. The agitator is operated at a speed of 1500 to 3000 r.p.m.

A suitable operating temperature for the stripper is 70° C., but any temperature from 50 to 100° C. can be used. The mercury vapor is entrained in the gas.

The mercury vapor-containing gas phase leaves the stripper 1 via the outlet line 6, and passes through the gas-liquid separator 7, where any entrained liquid is separated, and returned via line 12 to the scrubber 1. The mercury-containing inert gas then enters the base of the absorption tower 8, and percolates upwardly countercurrently to a downward flow of washing solution, such as aqueous sodium chloride containing free chlorine. An intimate contact between the gas and the liquid is ensured by the gas packing, and this tower is operated at room temperature. The mercury is stripped, and dissolves in the liquid in the form of $HgCl_4^=$. The solution containing mercury chloride is then removed through the outlet 11, and returned to the electrolysis cell, together with alkali chloride solution for electrolysis.

Preferred embodiments of the invention are illustrated in the examples.

EXAMPLE 1

Using an apparatus similar to that shown in the figure, but operating on a semi-plant or pilot plant scale, and adjusted for batchwise operation, a 42% aqueous sodium hydroxide solution containing 1.1 mg. of mercury per kilogram as free mercury was introduced into the stripper. A number of runs were made, with the sodium hydroxide solution in the gas stripper at 65° C., 80° C., 90° C., and 100° C. The inert gas used for stripping the mercury from the solution was air, and a good mixture between the air and sodium hydroxide was obtained by operating the agitator at a speed of 1500 r.p.m.

The mercury vapor-containing air was then passed into the absorption tower 8 countercurrently to a flow of saturated aqueous sodium hydroxide solution containing 0.1 g. per liter free chlorine as $Cl_2$, operated at room temperature.

The following results were obtained:

TABLE I

| Stripping time | Percent of the total quantity of Hg charged at— | | | |
| --- | --- | --- | --- | --- |
|  | 65° C. | 80° C. | 90° C. | 110° C. |
| (1) Quantity of Hg in the NaOH solution: | | | | |
| After 10 mins. stripping | 75 | 39 | 28 | 18 |
| After 20 mins. stripping | 56 | 28 | 18 | 18 |
| After 30 mins. stripping | 45 | 21 | 11 | 4 |
| (2) Quantity of Hg in the departing air, after 30 mins. stripping | 55 | 79 | 89 | 96 |
| (3) Quantity of Hg in the NaCl solution, after 30 mins. stripping | 55 | 79 | 88 | 96 |

Effective results are obtained at from 65 to 100° C. It is apparent however that the mercury should be stripped from the aqueous sodium hydroxide solution at as elevated a temperature as is convenient, for most rapid and effective removal of mercury from the sodium hydroxide, and to obtain a practically quantitative absorption of mercury in the chlorine-containing sodium chloride solution.

EXAMPLE 2

Effluent water obtained from the electrolysis of sodium chloride and containing 0.011 mg. of free metallic mercury per liter and 0.005 mg. of ionic mercury per liter, was charged with 100 mg. of sodium dithionite and 100 mg. of sodium sulfite per liter of effluent water using the apparatus of Example 1. The resulting mixture was allowed to stand for 2 minutes, and was then heated to a temperature within the range from 5 to 60° C., as shown in Table II, and then charged to the apparatus shown in the figure. The stripping time was 5 minutes. The washing liquid for the mercury-containing inert gas was a saturated aqueous sodium chloride solution containing 0.1 g. of free chlorine as $Cl_2$ per liter. The following results were obtained:

TABLE II

| Temperature, ° C. | Quantity of mercury in effluent water subsequent to being purified in the stripper (mg./Hg/l.) | Quantity of mercury in the chlorine containing sodium chloride solution, (percent of Hg in the effluent water) |
|---|---|---|
| 5 | <0.001 | 100 |
| 10 | <0.001 | 98 |
| 15 | <0.001 | 99 |
| 30 | <0.001 | 100 |
| 60 | <0.001 | 100 |

It is apparent from the above results that a quantitative stripping of both metallic and ionic mercury as mercury vapor from the effluent water can be obtained at temperatures ranging from 5 to 60° C., and that the mercury vapor can be recovered virtually qauntititively by washing the resulting gas mixture with chlorine-containing sodium chloride solution.

EXAMPLE 3

A continuous flow of sodium hydroxide solution having a concentration of 44% NaOH was passed through the gas stripper 1 of the apparatus shown in the figure, with the agitator 4 operated at 2500 r.p.m. Air was used as the stripping gas, and in order to separate mercury vapor from the stripping gas, a saturated aqueous sodium chloride solution containing 0.1 g. of free chlorine as $Cl_2$ was used. The results obtained are shown in Table III:

TABLE III

| Temperature, ° C. | Quantity of Hg in sodium hydroxide solution passed to the stripper (mg. Hg./l.) | Quantity of Hg in sodium hydroxide solution after the stripper (l./min.) | (Mg. Hg./l.) | Quantity of Hg in chlorine containing NaCl solution (percent of total stripped Hg) |
|---|---|---|---|---|
| 45 | 1.1 | 5 | 0.09 | 99 |
| 45 | 0.9 | 10 | 0.3 | 99 |
| 45 | 1.0 | 20 | 0.4 | 100 |
| 90 | 1.0 | 5 | 0.10 | 99 |
| 90 | 0.8 | 10 | 0.14 | 98 |
| 90 | 0.7 | 20 | 0.21 | 100 |
| 105 | 0.7 | 5 | 0.07 | 99 |
| 105 | 0.8 | 10 | 0.12 | 98 |
| 105 | 0.8 | 20 | 0.16 | 100 |

It is apparent from the above data that good separation of mercury from the mercury-containing liquid is obtained at temperatures ranging from 45 to 105° C. The higher the temperature, the higher the proportion of mercury recovered from the sodium hydroxide solution. Absoption of mercury in the chlorine-containing sodium chloride solution was virtually quantitative at all temperatures.

EXAMPLE 4

A continuous flow of mercury-containing effluent water was passed through the apparatus shown in the figure, with the agitator operating at 1800 r.p.m. A solution containing sodium dithionite and sodium sulfite was metered to the effluent water in such quantities that the content of sodium dithionite and sodium sulfite each was 0.10 g. per liter. The washing liquid was saturated aqueous sodium chloride solution containing 0.13 g. of free chlorine as $Cl_2$ per liter. The results obtained at temperatures ranging from 5 to 40° C. are shown in Table IV:

TABLE IV

| Temperature, ° C. | Quantity of Hg in effluent water to the stripper (mg. Hg./l.) | Quantity of Hg in effluent water after the stripper (mg./Hg/l.) | Quantity of Hg in chlorine-containing NaCl solution (percent of the total quantity) |
|---|---|---|---|
| 5 | 0.011 | <0.001 | 99 |
| 5 | 0.010 | <0.001 | 100 |
| 10 | 0.012 | <0.001 | 99 |
| 10 | 0.016 | <0.001 | 99 |
| 40 | 0.013 | <0.001 | 100 |

The results show that it is possible by continuous operation of the apparatus shown in the figure to obtain good purification of mercury-containing effluent water. The amount of mercury remaining in the effluent after the stripper was negligible, and the mercury vapor absorption in the chlorine-containing sodium chloride solution was virtually quantitative.

Having regard to the foregoing disclosure, the following is claimed as the inventive and patentable embodiments thereof:

1. A process for stripping liquid-mercury-containing liquids of metallic mercury which comprises heating the liquid at a temperature of at least 50° C. at which a high vapor pressure of mercury is obtained, entraining the mercury vapor thus formed in an inert gas, and removing the mercury vapor from the liquid, washing elemental mercury vapor from the inert gas with an aqueous solution containing an oxidizing agent and a mercury complexing agent, oxidizing the mercury vapor to mercury ion and complexing the mercury ion in the form of soluble complex mercury ion.

2. A process according to claim 1, in which the oxidizing agent is active chlorine, and the mercury complexing agent is chloride ion.

3. A process according to claim 2, in which the solution containing active chlorine comprises a substance selected from the group consisting of chlorine-containing alkali chloride solution, chlorine water, and alkali hypochlorite.

4. A process according to claim 1 which comprises reducing mercury in the liquid in ion form to elemental mercury prior to stripping the mercury from the liquid phase with an inert gas.

5. A process according to claim 4, in which the reducing agent comprises a substance selected from the group consisting of hydrazine, hydroxylamine, a dithionite compound, and a mixture of dithionite compound with a sulphite compound.

6. A process according to claim 1 in which the inert gas is air.

7. A process according to claim 1 in which the liquid is aqueous sodium hydroxide solution and the mercury is stripped at a temperature within the range from about 50° to about 110° C.

8. A process according to claim 1 in which the liquid is water.

9. A process according to claim 1 which comprises combining the liquid obtained in the electrolysis of alkali chloride and the washing solution containing the oxidizing agent enriched with complex mercury ion with an aqueous alkali chloride solution to be electrolysed.

References Cited

UNITED STATES PATENTS

| | | | |
|---|---|---|---|
| 3,647,359 | 3/1972 | Bell | 204—99 X |
| 1,984,164 | 12/1934 | Stock | 23—4 |
| 3,115,389 | 12/1963 | Deriaz | 204—99 X |
| 3,600,285 | 8/1971 | Botwick | 204—99 |
| 3,660,261 | 5/1972 | Wright et al. | 204—98 |

JOHN H. MACK, Primary Examiner

D. R. VALENTINE, Assistant Examiner

U.S. Cl. X.R.

423—210